United States Patent   [11] 3,616,149

| [72] | Inventors | Robert C. Wincklhofer<br>4753 Stornoway Drive;<br>Gene C. Weedon, 5431 Lingle Lane,<br>Richmond, Va. 23234; George H.<br>Collingwood, 3202 Clay St., Hopewell, Va. 23860 |
|------|-----------|---|
| [21] | Appl. No. | 727,327 |
| [22] | Filed | May 7, 1968 |
| [45] | Patented | Oct. 26, 1971 |

[54] DIMENSIONALLY-STABLE FABRIC AND METHOD OF MANUFACTURE
36 Claims, No Drawings

[52] U.S. Cl. .................................... 161/89,
156/181, 156/306, 161/150, 161/170, 161/176,
264/122, 264/322
[51] Int. Cl. ........................................ D04h 1/04,
D03d 15/02, D02g 3/36
[50] Field of Search ............................. 161/72, 88,
89, 150, 170, 175; 260/857; 264/171 F, 171 R,
122, 322; 156/181, 306

[56] References Cited
UNITED STATES PATENTS

| | | | | |
|---|---|---|---|---|
| 2,500,282 | 3/1950 | Francis ...................... | 161/150 |
| 2,543,101 | 2/1951 | Francis ...................... | 161/150 X |
| 3,099,067 | 7/1963 | Merriam et al. ............ | 28/82 |
| 3,348,993 | 10/1967 | Sissors ...................... | 161/81 X |
| 3,369,057 | 2/1968 | Twilley ...................... | 260/857 |
| 3,382,305 | 5/1968 | Breen ........................ | 264/171 |

FOREIGN PATENTS

| 1,035,908 | 7/1966 | Great Britain ............... | |

Primary Examiner—Robert F. Burnett
Assistant Examiner—Roger L. May
Attorneys—Francis W. Guay and Roy H. Massengill ABSTRACT: Articles are manufactured from heat-treated fabric composed of filaments prepared from blended fiber-forming polymers having different chemical properties, at least one of the fiber-forming polymers being dispersed as fibrils in a lower melting point polymeric matrix. The article is produced by preforming the fabric, during production of the fabric itself or by subsequent operation, and heating the latter to a temperature above the melting point of the matrix forming material but below the melting temperature of the dispersed fibrils to set the fabric in its preformed shape. In general the treated fabric is characterized by high stiffness, moldability, dimensional stability, and resistance to mechanical abuse and wrinkling.

DIMENSIONALLY-STABLE FABRIC AND METHOD OF MANUFACTURE

BACKGROUND OF THE INVENTION

In a previous development, multiconstituent filaments were produced having a nylon matrix with microfibers of polyester dispersed therein. These filaments (described and claimed in Twilley U.S. Pat. No. 3,369,057, which patent is hereby incorporated by reference as if fully set out herein) were originally prepared for employment in high strength yarns useful in yarn or cord form as reinforcing strands in elastomeric tires, conveyor belts, seat belts, hoses, and the like. In particular, when used to reinforce tires, the Twilley filaments have a higher tensile modulus than do normal polyamide filaments from the same polyamide, and significantly lower cured strength loss, thereby producing stronger and more durable tires with much less undesirable flat spotting.

PRIOR ART

It is well known that the physical characteristics of one polymer or a mixture of polymers can be varied greatly by changing the relative ingredient proportions or by mixing with another polymeric or additive material. Usually these are blend systems of polymers and/or copolymers wherein the various materials are mixed together to form a homogeneous mass which is then conventionally molded, calendered, etc., as described, for example, in Renfroe U.S. Pat. No. 3,336,173 wherein polyamide is blended with a polyolefin to improve the high frequency welding ability of the latter; Yasui et al. U.S. Pat. No. 3,322,854 disclosing homogeneous mixtures of polymers and/or copolycondensated polymers to improve polyester moldability, resistance to wrinkle and dyeability; and Fukushima U.S. Pat. No. 3,359,344 disclosing improved polyethylene, polypropylene or polystyrene calendered films made by incorporating chopped strands of a blended fiber and comprised of polyolefin and a high molecular weight material.

SUMMARY

The present invention is to be distinguished from the above products and processes in that multiconstituents result in a matrix material containing a dispersion of discontinuous microfibers having a substantially higher melt point than the matrix. Although the various polymers are mixed together in this invention, they are not entirely intermiscible due to their physical properties and/or the mixing technique employed to assure a dispersion of microfibers. Microsized globules of fibrils are usually initially produced in the matrix, which when spun and drawn, produce the desired microfibrillar dispersion in the lower melting matrix material.

In accordance with this invention, it has been discovered that fabric composed of filaments of the type described in U.S. Pat. No. 3,369,057 may be heat-treated to form articles having improved shape stability and yet the fabric will retain its original textile appearance. The multiconstituent filaments and yarn produced therefrom may be heated to a setting temperature without significant flow or cross-sectional flattening or disfiguration, thereby permitting controllable porosity, fabric appearance, coloration, texture, etc., with improved strength as mentioned above and other advantages hereinafter discussed. Thus an important feature of this invention is that a microfiber dispersion is intentionally created and preserved throughout the heat-setting phases of article production. With the above as a basis, it was further discovered that various other polymer blend systems having at least two polymers of varying melt temperatures, one polymer being dispersed as discontinuous fibrils in a matrix of the other, can be employed to produce articles of stabilized shape, and although nylon-polyester blends of the type mentioned in the Twilley patent provide the best results, such other blend systems as will be described are intended to be embraced by, and included in, this invention. The principal objects of this invention are, therefore, to provide novel articles and methods of producing the same, without limitation to specific shapes or forms. Other objects will be described and will become apparent to those skilled in the art from the following description of the best mode of carrying out the invention and examples thereof, and the appended claims.

As used herein these terms are intended to have the following meaning:

Multiconstituent filaments—filaments made by inclusion of at least one polymeric material in a matrix of another as discontinuous fibrils, the two materials having substantially different melt temperatures such that fibrous constructions composed thereof can be heat-set by application of heat below the melt temperature of one and equal to or above that of the other, the entire filament composition or any component thereof optionally including any secondary material compatible with the heat-set property of the fabric as a whole such as antioxidants and other stabilizing agents, reinforcing particles, fillers, adhesion promoting agents, fluorescent materials, dispersing agents, and others useful in polymerization, extruding, spinning, fabric forming and shaping, heat-setting and product finishing techniques. If desired, inorganic materials such as metal whiskers, fiber glass fibrils, asbestos particles and the like may be incorporated for conductive and/or reinforcement purposes.

Textile material—any woven, knitted or nonwoven fibrous structure.

In general the invention is applicable to textile material prepared from multiconstituent filaments or yarn of any combination of polymeric materials capable of creating a matrix and having a relatively higher melting dispersion of discontinuous fibrils; however, it is clear that a polyester-polyamide combination produces outstanding articles over the other materials. These compositions may contain 50–90 parts by weight nylon and 50–10 parts by weight polyester dispersion. Other materials useful in multiconstituent fibers are polyolefins, polysulfones, polyphenyl oxides, polycarbonates, and other polyamides and polyesters. In any combination of any of the foregoing, the higher melting material is dispersed in the form of fibrils in a matrix of the other. In all of the blends mentioned hereinafter, heat-setting and improved shape stability was achieved. Examples of the most useful polyolefin materials are polyethylene, polypropylene, poly-1-butene, poly-2-butene, polyisobutylene and polystyrene. In addition to the preferred nylon 6 (polycaproamide), other suitable polyamides are nylon 6–10 (hexamethylene-diamine-sebacic acid), nylon 66 (hexamethylene-diamine-adipic acid), methanol- and ethanol-soluble polyamide copolymers and other substituted polyamides such as the alkoxy-substituted polyamides. The preferred polyester is polyethylene terephthalate; others are polyesters of high $T_G$ useful in the practice of the present invention, including those polymers in which one of the recurring units in the polyester chain is the diacyl aromatic radical from terephthalic acid, isophthalic acid, 5-t-butylisophthalate, a naphthalene dicarboxylic acid such as naphthalene 2,6 and 2,7 acids, a diphenyldicarboxylic acid, a diphenyl ether dicarboxylic acid, a diphenyl alkylene dicarboxylic acid, a diphenyl sulfone dicarboxylic acid, an azo dibenzoid acid, a pyridine dicarboxylic acid, a quinoline dicarboxylic acid, and analogous aromatic species including the sulfonic acid analogues; diacyl radicals containing cyclopentane or cyclohexane rings between the acyl groups; and such radicals substituted in the ring, e.g., by alkyl or halo substituents.

The following specific example is the preferred embodiment of this invention. Multiconstituent filament is produced in accordance with the formulation of Example 1 in U.S. Pat. No. 3,369,057, i.e., granular polyethylene terephthalate polymer was used, melting about 255° C. (DTA) and about 265° C. (optical), having density (when amorphous) of about 1.33 grams per cc. at 23° C. and about 1.38 grams per cc. in the form of drawn filament, having reduced viscosity of about 0.85 and having $T_G$ about 65° C. The polyester in the form of drawn filament drawn to give ultimate elongation not above 20 percent will have tensile modulus (modulus of esasticity)

ranging from about 70 to about 140 grams per denier, depending on spinning conditions employed.

This polyester (30 parts) was mixed with 70 parts of granular polycaproamide having reduced viscosity about 1.04, $T_G$ about 35° C. and density about 1.14 grams per cc. at 23° C. Amine groups in this polycaproamide had been blocked by reaction with sebacic acid, bringing the amine group analyses thereof to 11 milliequivalents of $NH_2$ groups per kilogram of polymer. This polycaproamide contained as heat stabilizer, 50 p.p.m. copper as cupric acetate.

The mixture of polyamide and polyester granules was blended in a double cone blender for 1 hour. The granular blend was dried to a moisture content of no more than 0.01 percent; then melted at 285° C. in a 3½-inch diameter screw extruder operated at a rotational speed of about 39 r.p.m. to produce a pressure of 3,000 p.s.i.g. at the outlet. A dry nitrogen atmosphere was used to protect the blend against absorbing moisture. Residence time in the extruder was 8 minutes.

The molten mixture thereby obtained had melt viscosity of about 2,000 poises at 285° C. The polyester was uniformly distributed throughout and had average particle diameter of about 2 microns, as observed by cooling and solidifying a sample of the melt, leaching out the polyamide component with formic acid, and examining the residual polyester material.

The milticonstituent blend thus produced was extruded through a spinneret plate and the resulting fibers were drawn and wound, the final yarn denier being 70 grams per 9,000 meters. Two ends of this yarn were plied together resulting in a 140 denier yarn. Each of the original yarns was comprised of 16 filaments each; the final plied yarn had 32 filaments. The plied yarn was then texturized or crimped using conventional techniques, and fashioned into a Swiss pique circular knit fabric using conventional knitting equipment (hereinafter referred to as Fabric A). The weight of the fabric was 5 ounces per square yard. The fabric was molded into a conical shape of a size and configuration useful as brassiere cups. A 60° stainless steel cone 4 inches in height and 4 inches in diameter across the base and a large radius of curvature at the tip, and a 60° Pyrex glass cone 3½ inches in both height and base diameter were heated in a forced draft oven. When the oven had maintained the preselected temperature for 10 minutes, the oven door was opened quickly and the fabric was rapidly positioned above the top of the metal cone. The glass cone was placed above the fabric and then quickly thrust downward by hand toward the metal cone. A 2,000 gram weight was positioned at the top or apex of the glass cone to maintain fabric-mold contact. The optimum balance between strength, color and hand is obtained with application of heat in this manner at 240° C. for 30-60 seconds although satisfactory results were achieved within the range of 230°-250° C. over different time periods. The resulting conical product was a tough, rigid article with outward fiber or textile appearance.

For comparative purposes, the above procedure was repeated in all respects except that the fiber-forming material was 100 percent nylon 6 (Fabric B), 210 denier-14 filament 100 percent nylon 6 untexturized yarn in a two rib by two rib knitted fabric, 5 ounces per square yarn (Fabric C) and 210 denier-14 filament 100 percent polyethylene terephthalate (Fibric D).

Fabrics B and C, 100 percent nylon 6, could not be molded into a rigid, conical shape. At 230° C. both fabrics started melting within 60 seconds; at 225° C. within 60-90 seconds; and at 220° C. within 180 seconds. At 215° C. no noticeable change in stiffness was noted although the fabric was deformed into a conical shape. Fabric D, 100 percent polyethylene terephthalate, could be molded into a rigid shape at 250° C., however, this material was much less durable.

Conical forms of fused, molded Fabrics A and D were subjected to mechanical abuse testing in order to determine the degree of durability of the molded fabric. A cylindrical fiber board drum (13 inches in diameter and 19 inches in height attached at the lengthwise or height midpoint of the cylinder to a variable speed motor) was used to contain the molded cones. Several mechanical abraders-abusers were then tested for their effect on the molded forms.

EXAMPLE 1

Small highly elastic rubber balls (6 each) and 10 molded cones of Fabric A fused at 230°-250° C. for various times from 15 seconds to 180 seconds were tumbled for 24 hours at 40 r.p.m. in the drum. This treatment produced no discernible change in the shape, softness, nor outward appearance of Fabric A.

EXAMPLE 2

Example 1 was repeated except molded cones of Fabric D were used. Cones molded at 230° C. were very soft and pliable after 24 hours at 40 r.p.m. with the rubber balls. Cones molded at 250° C. were softened but were capable of maintaining a generally conical shape if rested upon the base of the cone.

EXAMPLE 3

Example 1 was repeated except 3 (three) sections of heavy rubber hose (⅝ inch I.D; ⅞ inch O.D. total weight of 60 grams each) 8 inches in length were used in place of the rubber balls. The duration of the tumbling was 2 hours. Fabric A molded at 250° C. was totally unaffected by this treatment. Fabric A molded at times of 60 seconds or more at 230° C. was also unaffected. Fabric A molded for 30 seconds at 230° C. was slightly softened by this treatment.

EXAMPLE 4

Example 3 was repeated except cones molded from Fabric D were used. Fabric D molded cones were noticeably softened by the rubber hoses. At temperatures less than 250° C. and times of less than 60 seconds at 250° C., the cones lost all structural rigidity.

EXAMPLE 5

Example 3 was repeated except an additional two hours of tumbling with six stainless steel balls ½ inch in diameter was initiated after the two hours tumbling with the rubber hose. This treatment did not reduce to any noticeable degree the stiffness of the molded cones of Fabric A as observed after the previous rubber hose treatment. Slight abrasion or softening at the apex of the cones did occur, however, as a result of this treatment.

EXAMPLE 6

Example 5 was repeated except molded cones of Fabric D molded at 250° C. were used. The cones molded at 90-150 seconds underwent a total loss in rigidity after the treatment described.

In order to further demonstrate the mechanical strength of the fused, molded 70 percent nylon/30 percent polyester fabric, the following example is cited: Three molded cones were prepared from Fabric A using molding times of 10, 15 and 30 seconds. One specimen of each molded cone was loaded tip-on with a static load of 100 p.s.i. (1,200 grams over a 4 inch diameter circle). The cones were subsequently crushed flat by applying the necessary hand pressure to completely flatten the cone. After 15 minutes under the static load, the weight was removed. The cones, all of which returned to their original shape, were then placed in hot water at 160°-170° F. for 30 minutes. After the samples were removed from the water, almost no residual wrinkles or creases could be observed in the cones.

As an example of a blend of two different materials in the same general class, a blend was prepared consisting of 30 percent polyethylene and 70 percent polypropylene by weight. Both resins were commercially available grades. The blend was spun using a 1 inch extruder having a 24 to 1 L/D ratio.

The spinning temperatures were 280°-290° C. A 20-hole spinneret having a 0.020 mil diameter capillary with an L/D ratio of 10 to 1 and a 20° entrance angle was used. After spinning and drawing the filament was used to produce a fabric which was heat-set in accordance with the principles outlined above except the temperature should be below about 180° C.

In addition, still other blends are satisfactory for purposes of this invention, including those disclosed in U.S. Pat. Nos. 3,378,055, 3,378,056, and 3,378,602; British Pat. No 1,097,068; Belgian Pat. No. 702,813; and Dutch Pat. No. 66,06838.

Several heating systems have been studied for multiconstituent fabric, as for example, a forced air oven with a nitrogen purge, a static draft oven without nitrogen, heated match-die molds, a molding press (without pressure) and a steam autoclave. The method of heating is of little consequence, with the autoclave having only slight advantages in that there is no discoloration since lower fusion temperatures can be achieved thereby.

For any given multiconstituent formulation, the temperature and time will vary depending on the polymeric materials, article size, shape, desired rigidity, mode of heat application and other variables. In general, it is necessary to apply heat without excessive degradation of sufficient intensity and duration at least as high as the melting point of the matrix component until the fabric yarns have fused to each other yet still retain the yarn or fabric identity. If the fabric yarns are spun from polyblend staple fibers, the fibers forming said yarn will fuse together individually in addition to fusion at the cross points of said fabric. Fusion can be achieved without undesirable flow; it is this phenomenon which permits the present invention to provide unique dimensional stability and appearance to textile materials and, therefore, regulates the minimum and maximum heat-set conditions. Thus, the fabric interstices are practically unaltered by the fusion as described herein since there is no polymer flow or migration, provided the dimensions of the fabric are maintained.

Thus, while no empirical or mathematical formula has been found for determining the minimum heat-setting conditions to fuse multiconstituent yarns, appearance after heating, and in particular, after fusion and removal of the nylon by formic acid has been found to be an important criterion.

The discovery has been made that an unusual fusion characteristic of this invention exists in the structure formed by the dispersed fibrils which unexpectedly are bonded together even though the melt temperature thereof has not been reached during the heat-set operation. The appearance of this fused microfibrillar dispersion can be evaluated as a reliable index of the degree of fusion.

As indicated above, for a 70/30 nylon-polyester combination, the optimum fusion temperature is approximately 240° C. for efficient fusion, fiber integrity retention, coloration, and controllable hand. Naturally the time for fusion is dependent on many factors, including the filament or yarn size, fabric construction, i.e., knit, weave, loose, tight, etc., and of course, the type product desired from the fusion process. Thus, time periods are determined by the mass to be heated and the type of heat source employed. For example when employing an oven, durations as short as 15-20 seconds at 240° C. have been found effective for at least partial fusion when a soft hand product is desired. Fusion times of up to 300 seconds and longer at 250° C. have been tested for Fabric A, and although fusion was achieved breaking strength of the microfibrillar polyester fabric was reduced somewhat. A gradual increase in fabric strength occurs after an initial drop at 30-60 seconds at 240° C., and the strength level of the fabric fused at 240° C. for times greater than 60 seconds is higher than 230° C. and 250° C. fused samples. It is theorized that this phenomenon is achieved by additional crystallization of the polyester component at about 240° C.

To summarize, for 70 denier yarn, 30 to 60 seconds in a dry oven at 240° C. appears to be the optimum fusion conditions where substantially complete fusion is desired, as determined by removing the nylon with formic acid to determine if the polyester has formed a true fabric appearance, being cohesive, elastic and surprisingly strong.

In applying heat to set the multiconstituent fabric it is possible to set only one side thereof to produce a unique fabric. For example with a fabric fashioned from 70 denier yarn such as Fabric A, a very soft pleasing hand may be achieved on one side of the fabric by conventional means while at the same time the material can be dimensionally stabilized by exposure of heat to the other side. Such a fabric is useful, for example, in the production of wrinkle resistance fabric or permanent crease type garments, and also may be employed in the production of garments requiring a hard or tough exterior or surface. The selective heating may be accomplished in a mold where only the male or female side is heated while the other is cooled or allowed to remain unheated during the short period required for heat-setting the other side, or the fabric may be passed over a heated roll or a series of rolls, one of which is heated to a temperature sufficient to fuse the desired surface. In case of the latter, pressure may be applied to the fabric but only to the extent deemed desirable and without destroying the fabric appearance of the material being processed. Of course the conditions for time and temperature control will be dictated by the type of materials employed and the amount of fusion desired.

It is also a feature of this invention to fuse only portions of a fabric whereby a design may be achieved. This may be accomplished by heating with a grid or platen applied to one or both sides of the fabric. To achieve sharp definition, the heated applicator should have a sharply defined pattern which can be applied under sufficient pressure to insure fusion which may or may not destroy the fabric appearance of the heated fabric portions in intimate contact therewith to create a more solid and distinguishable surface as compared with the surfaces which are not fused. However, the invention contemplates the fusion of various surface areas in pattern form which will then have different dyeability and hand characteristics resulting in ornamental designs, configurations, and/or patterns of unique construction.

Tables A and B illustrate heat-set (or fusion) conditions and properties of and for various polymer combination of this invention. Table C provides data relating to fabric construction and fusion conditions. And, table D shows data from fusing of nylon-polyester blends, and the effect of certain physical properties resulting from time-temperature variations.

Fabric properties after processing are tested especially at certain temperatures and time periods; however, any effects may be offset or substantially reduced by incorporation of any appropriate additive in the multiconstituent blend. Examples of the most significant additives mentioned above in the definition of multiconstituent filaments are Irganox 565 to reduce discoloration and slight strength improvement and Santowhite powder which increases strength retention by approximately 50 percent in some blends. Santowhite powder and Irganox 565 also improve color after fusion.

TABLE A

| Composition | Denier per fil. | Construction | Fusion conditions Time (sec.) | Temp. (°C) | Breaking* strength/ inch width of fabric (grams) | Stiffness** |
|---|---|---|---|---|---|---|
| 85% Nylon 6 15% PET | 70/16 | 1x1 rib knit | 90 | 240 | 2820 | |
| 70% Nylon 6 30% PET | 70/16 | 1x1 rib knit | 90 | 240 | 2980 (unfused) | 260,000 700 |
| 60% Nylon 6 40% PET | 70/16 | 1x1 rib knit | 90 | 240 | 2370 | |
| 50% Nylon 6 50% PET*** | 70/16 | 1x1 rib knit | 90 | 240 | 2260 | |

*In wale direction for knits; warp direction for woven goods.
**Load in grams extrapolated to 100% elongation from initial straight line portion of stress-strain curve.
***Slight amount of phase inversion reduces breaking strength.

TABLE B

| Composition | Denier per fil. | Construction | Fusion conditions Time (sec.) | Fusion conditions Temp. (°C) | Breaking strength/inch width of fabric (grams) | Stiffness |
|---|---|---|---|---|---|---|
| 100% PET | 70/16 | 1x1 rib knit | 90 | 240 | 2,530 | Limp, cloth-like. |
| 70% Nylon 6 30% PET | 70/32 | 1 oz/yd² Taffeta (woven) | 90 | 240 | 12,240 | Crisp, paper-like |
| 70% Nylon 6 30% PET | 840/136 840/136 | Plain weave, 19 picks/in warp & fill | 180 | 252 | 39,020 | |
| 70% Nylon 6 30% PET | 840/136 | 2x2 rib knit | 75 | 252 | 91,020 (unfused) | 1,000,000 83,000 |
| 25% Nylon 6 75% Polypropylene | 210/14 | 1x1 rib knit | 90 | 200 | 4,680 (unfused) | 56,800 1,130 |
| 70% Nylon 6, 1,6 (copolymer of nylon 6 and 10% hexamethylene diamine-isophthalic acid salt) 30% PET | 100/20 | 1x1 rib knit | 30 | 230 | 2,860 | |
| Fusion other than with heat only | | | | | | |
| 70% Nylon 6 30% PET | 70/16 | Swiss pique circular knit 5 oz/yd² | 120 (in steam autoclave at 128 psi) | 180 | 13,050 | |

Using the 70 to 30 percent polyamide/polyester multiconstituent filaments described above, three knitted fabrics representing various degrees of knit and denier were fused under identical conditions to determine the simultaneous effect of fabric type and exposure time on the properties of the cloth. As shown in table C, the loss in elasticity and strength of the fabrics was identical after 30 seconds at 230° C. After 1 minute, the percent strength retention of all the fabrics varied between 60 and 70 percent. No discernible pattern of increasing or decreasing strength developed as the exposure time increased. The variations in the level of strength retention can be attributed to differences in the amount of tension on the fabric as it was mounted in the retaining ring before exposure. In all tests involving the fusion of flat fabrics a constant length condition was maintained to avoid any shrinkage that might occur.

A quantitative comparison of the stiffness of the different knits was impossible. The fused fabrics were immeasurably stiffer than the original material. Although the appearance of the fused structure is that of a fabric, the rigidity of the material is closer to that of a solid molded plaque of comparable thickness. In terms of stiffness, the fused structure was too stiff for normal fabric stiffness tests, e.g., inclined plane or heart-loop. Since there was no method to measure a meaningful cross-sectional area in the fabric, an engineering stiffness such as tensile modulus data could not be derived from the stress/strain curves.

After fusion, all of the knits lost their soft, pliant character. The fused fabrics all felt smooth and hard except at very low-exposure times (less than 90 seconds). Depending upon the particular end-use area, the molding conditions will vary to produce the correct balance of stiffness and softness for that particular application.

The most practical temperature range for the fabrics prepared for this test was in the range of 230°–250° C. with exposure times of less than 3 minutes.

TABLE C

Effect of Fabric Construction on Properties after Fusion

| Exposure conditions Time (sec.) | Exposure conditions Temp. (°C) | Fabric type | Breaking strength (grams)* | Percent breaking strength retention | Percent elongation |
|---|---|---|---|---|---|
| Control | R.T. | Single knit | 10,480 | | 138 |
| 30 | 230 | 210/14 | 12,530 | +100 | 145 |
| 60 | | Open knit | 6,620 | 63 | 28 |
| 90 | | | 7,510 | 72 | 91 |
| 120 | | | 6,450 | 62 | 34 |
| 150 | | | 6,190 | 59 | 24 |
| 158 | | | 5,780 | 55 | 23 |
| 240 | | | 7,220 | 69 | 33 |
| 300 | | | 6,410 | 71 | 35 |
| Control | R.T. | Double knit | 10,770 | | 112 |
| 30 | 230 | 70/16 | 9,670 | 89 | 103 |
| 60 | | Close knit | 6,900 | 64 | 33 |
| 90 | | | 6,700 | 62 | 30 |
| 120 | | | 7,170 | 67 | 38 |
| 150 | | | 7,240 | 67 | 38 |
| 180 | | | 7,460 | 69 | 34 |
| 300 | | | 7,130 | 66 | 29 |
| Control | R.T. | Rib knit | 15,150 | | 133 |
| 30 | 230 | 70/16 | 16,130 | +100 | 153 |
| 60 | | Close knit | 9,500 | 63 | 56 |
| 90 | | | 8,650 | 57 | 30 |
| 120 | | | 9,280 | 61 | 45 |

*In direction of knitting; specimen width is ½ inch.

TABLE D

Properties of Fused Fabric
(Double knit 2/70/16 fabrics)

| Fusion conditions Time (sec.) | Fusion conditions Temp. (°C) | 85/15 Nylon-polyester Breaking strength (grams)* | 85/15 Nylon-polyester Percent breaking strength retention | 85/15 Nylon-polyester Elongation (%) | 70/30 Nylon-polyester Breaking strength (grams)* | 70/30 Nylon-polyester Percent breaking strength retention | 70/30 Nylon-polyester Elongation (%) |
|---|---|---|---|---|---|---|---|
| Control | R.T. | 14,000 | | 153 | 10,770 | | 112 |
| 30 | 230 | 6,720 | 48 | 24 | 9,760 | 89 | 92 |
| 60 | | 6,760 | 48 | 40 | 6,900 | 64 | 30 |
| 90 | | 5,700 | 41 | 30 | 6,700 | 62 | 27 |
| 120 | | 7,020 | 50 | 38 | 7,170 | 67 | 34 |
| 30 | 240 | 7,090 | 51 | 58 | 6,920 | 64 | 42 |
| 60 | | 7,080 | 51 | 51 | 6,790 | 63 | 21 |
| 90 | | 6,610 | 47 | 39 | 7,340 | 68 | 41 |
| 120 | | 6,120 | 44 | 41 | 7,590 | 71 | 41 |
| 180 | | 4,420 | 32 | 20 | 8,030 | 75 | 37 |
| 240 | | 6,690 | 48 | 29 | 7,580 | 70 | 49 |
| 30 | 250 | 4,620 | 33 | 43 | 6,470 | 60 | 47 |
| 60 | | 5,110 | 37 | 49 | 6,660 | 62 | 46 |
| 90 | | 5,240 | 37 | 28 | 5,330 | 51 | 38 |
| 150 | | 4,240 | 30 | 24 | 6,580 | 61 | 32 |

*Knit direction only; specimen width is ½ inch.

A decrease in the OCP viscosity of the blend after fusion was found at the lower temperature (230° C.), however, at 240°/250° C. the blend became OCP insoluble. The initial decrease in OCP viscosity was expected since the fabric was not dried prior to fusion. The decrease in viscosity, therefore, was attributed to hydrolysis of the blend components, The insolubility of the blend after treatment at higher temperatures, however, was not expected.

It was found that the total blend itself was not insoluble, but rather it was the polyethylene terephthalate component which was not soluble. The nylon matrix could be readily dissolved in formic acid even after fusion at 250° C. for 5 minutes. The polyethylene terephthalate microfibril fabric which remained after removal of the nylon, however, could not be dissolved in OCP. Apparently the noted insolubility was simply the result of unexpected crystallization of the polyethylene terephthalate during fusion.

The crystallization of the polyethylene terephthalate also contributes to an unusual strength retention effect noted at 240° C. After 90 seconds, there is an orderly increase in the strength retention of the fabric as the exposure time increases. This effect was noted in both rib (single) and double knit material. Evidently the conditions for crystallization of the polyethylene terephthalate are particularly favorable at 240° C.

The invention is applicable in many commercial fields such as apparel, home furnishings, transportation vehicles, building materials, sporting goods, filters, etc. A few specific examples are: hats, helmets, chair and auto seat covers, wall paneling, lamp shades, wrinkle-resistance apparel, embossed fabrics, run-resistant hose, carpet runners, appliance covers, screens, outdoor umbrellas and rain apparel, shirt collars and cuffs, bras and foundation garments, shoes, slippers and the like, cinder block wall facing, wall paper, light diffuser, folding door, acoustical coverings, luggage, golf bags, gas permeable shields, breathable casts, etc.

Take as an example of the versatility and value of the invention, the production of a shoe upper. A fabric comprised of multiconstituent yarn can be molded into the shape of a shoe upper, thereby eliminating the need for resins and resin curing while at the same time retaining fabric appearance such as lace or knits for fashion effects. The fabric can be laminated with fiber or coated with a plastisol, and need not be entirely of multiconstituent yarn, only enough to be capable of heat-setting and holding the shape of the article as a whole.

The fabric articles of this invention may be nonwoven. An unbonded web is formed from the multiconstituent filaments and then subjected to fusion conditions either during or after a shaping procedure. This unites the filaments together by the fusion bonds and sets the fabric in the desired shape.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A dimensionally-stable fabric, comprised of a heat-treated, fusion bonded textile material; said textile material being comprised of multiconstituent filaments spun from at least two different polymeric materials such that, in a given filament, a first fiber-forming polymeric material defines a matrix and a second polymeric material is dispersed therein in the form of discontinuous fibrils, said matrix comprising at least about 50 percent by weight of the filament and having a lower melting point than said dispersed fibrils; said textile material having been heat-treated at a temperature in the range above the melting point of the matrix but below the melting point of the dispersed fibrils such that the multiconstituent filaments thereof are set and fusion bonded at least at their cross points without substantial polymer flow, disfiguration, and cross-sectional flattening, whereby a textile appearance is retained; and said fused textile material being characterized by an enhanced stiffness ranging from a minimum value sufficient that articles shaped thereof within the above temperature range maintain their structural rigidity to a maximum value whereat the rigidity of the fused material approaches that of a solid molded plaque of comparable thickness.

2. An article as defined in claim 1 wherein the fabric is comprised of multifilament yarns.

3. An article as defined in claim 2 wherein the filaments comprising said multifilament yarns are at least partially fused together.

4. An article as defined in claim 1 wherein said filaments are fused together and retain their approximate original fabric-forming appearance and shape.

5. An article as defined in claim 1 wherein the fabric is a knitted construction.

6. An article as defined in claim 1 wherein the fabric is a nonwoven construction.

7. An article as defined in claim 1 wherein the fabric is a woven construction.

8. An article as defined in claim 1 in which the matrix forming polymeric material is comprised of at least one polymer selected from the group consisting of polyolefins, polyamides and polyesters.

9. An article as defined in claim 8 in which the dispersed polymeric material is comprised of at least one polymer selected from the group consisting of polyolefins, polyamides, polyesters, polysulfones, polyphenylene oxides and polycarbonates.

10. An article as defined in claim 9 in which the matrix forming polymeric material is a polyamide.

11. An article as defined in claim 10 in which said polyamide is polycaproamide.

12. An article as defined in claim 10 in which said polyamide is a reaction product of hexamethylene diamine and adipic acid.

13. An article as defined in claim 9 in which said dispersed polymeric material is a polyester.

14. An article as defined in claim 13 wherein said polyester is polyethylene terephthalate.

15. An article as defined in claim 9 in which the matrix forming polymeric material has a melting point at least 25° C. lower than the dispersed polymeric material.

16. An article as defined in claim 9 wherein said matrix forming polymer is a polyolefin.

17. An article as defined in claim 16 in which said polyolefin is polypropylene.

18. An article as defined in claim 16 in which said dispersed polymeric material is a polyolefin.

19. An article as defined in claim 18 in which said polyolefin is polyethylene.

20. An article as defined in claim 1 in which the dispersed polymeric material is comprised of at least one polymer selected from the group consisting of polyolefins, polyamides, polyesters, polysulfones, polyphenylene oxides and polycarbonates.

21. An article as defined in claim 1 in which the fabric is heat-treated on only one side thereof.

22. An article as defined in claim 1 wherein the matrix and fibril dispersions are fused to each other.

23. An article as defined in claim 1 wherein at least part of the fibrils are bonded together.

24. An article as defined in claim 1, wherein the textile material has been heat-treated under sufficient pressure that an area of its surface is solid and indistinguishable.

25. An article as defined in claim 1, in which the textile material is heat-treated on both sides thereof.

26. The method of manufacturing the dimensionally-stable fabric as defined by claim 1, comprising:
   a. providing textile material comprised of multiconstituent filaments spun from at least two different polymeric materials such that, in a given filament, a first fiber-forming polymeric material defines a matrix and a second polymeric material is dispersed therein in the form of discontinuous fibrils, said matrix comprising at least about 50 percent by weight of the filament and having a lower melting point than said dispersed fibrils;
   b. shaping said textile material to the configuration of the fabric desired;
   c. heat-treating and fusion bonding said textile material at a temperature in the range above the melting point of the matrix but below the melting point of the dispersed fibrils such that the multiconstituent filaments thereof are set and fusion bonded at least at their cross points without substantial polymer flow, disfiguration, and cross-sectional flattening, whereby a textile appearance is retained and the resultant fused textile material is characterized by an enhanced stiffness ranging from a minimum value sufficient that articles shaped thereof maintain their structural rigidity to a maximum value whereat the rigidity of the fused material approaches that of a solid molded plaque of comparable thickness.

27. A method as defined in claim 26 wherein said matrix material and said dispersed material each is comprised of at least one member selected from the group consisting of polyolefins, polyamides, polyesters, polycarbonates, polysulfones and polyphenylene oxides.

28. A method as defined in claim 27 wherein said textile material is comprised of a matrix of polyamide and a dispersion of polyester therein and said heat-treating is carried out by subjecting the fabric to approximately 230°–250° C.

29. A method as defined in claim 27 wherein the textile material is a knitted construction.

30. A method as defined in claim 27 wherein the textile material is a woven construction.

31. A method as defined in claim 27 wherein the textile material is a nonwoven.

32. A method as defined in claim 26 wherein the textile material is heat-treated on one broad surface only.

33. A method as defined in claim 32 wherein the textile material is simultaneously cooled on the other broad surface.

34. A method as defined in claim 26 wherein the heat-treating step precedes the shaping of the textile material.

35. A method as defined in claim 26, wherein the textile material is heat-treated on both broad surfaces thereof.

36. A method as defined in claim 26 wherein the textile material is heat-treated under sufficient pressure that an area of its surface is rendered solid and indistinguishable.

* * * * *